US012754867B2

(12) United States Patent
Chang et al.

(10) Patent No.: US 12,754,867 B2
(45) Date of Patent: Oct. 6, 2026

(54) NETWORK PROCESSING USING FIXED-FUNCTION LOGIC COMPONENTS CLOSE-COUPLED WITH PROGRAMMABLE LOGIC AND SOFTWARE

(71) Applicant: Microsoft Technology Licensing, LLC, Redmond, WA (US)

(72) Inventors: Chih-Jen Chang, Union City, CA (US); Manasi Deval, Redmond, WA (US); Parthasarathy Sarangam, Portland, OR (US); Ravi Tangirala, San Jose, CA (US); Kiran Ananda Patil, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 18/523,492

(22) Filed: Nov. 29, 2023

(65) Prior Publication Data

US 2025/0173301 A1 May 29, 2025

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .................................................. G06F 13/4221
(Continued)

(56) References Cited

U.S. PATENT DOCUMENTS 5,828,857 A * 10/1998 Scalise .................. G06F 13/124 713/600
6,260,087 B1 * 7/2001 Chang ................ H03K 19/1736 326/39

(Continued)

OTHER PUBLICATIONS

Daniel Firestone, Andrew Putnam, Sambhrama Mundkur, etc., "Azure Accelerated Networking: SmartNICs in the Public Cloud", USENIX the Advanced Computing Systems Association, Apr. 9, 2018, pp. 52-72, Retrieved from URL: https://www.usenix.org/sites/default/files/nsdi18_full_proceedings_interior.pdf (Year: 2018).*

(Continued)

*Primary Examiner* — Titus Wong
(74) *Attorney, Agent, or Firm* — Alleman Hall LLP

(57) ABSTRACT

Implementations of architectures for network processing using a fixed-function logic per-op component close-coupled with programmable logic and software are provided. One aspect provides an integrated circuit device for network processing, the device comprising a composable processing pipeline that includes a programmable per-op component and a fixed-function logic per-op component that is close-coupled with programmable logic and software. The device further comprises a compute complex component comprising processing circuitry implementing the software for controlling the programmable per-op component and the fixed-function logic per-op component, wherein for a first processing pipeline, the processing circuitry is configured to perform a first function using the programmable per-op component, and for a second processing pipeline, the processing circuitry is configured to perform a second function using the fixed-function logic per-op component.

18 Claims, 8 Drawing Sheets

(58) Field of Classification Search
USPC .......................................................... 710/105
See application file for complete search history.

(56) References Cited

U.S. PATENT DOCUMENTS

| | | | | |
|---|---|---|---|---|
| 7,295,571 | B2 * | 11/2007 | Liu | G06F 9/3867 370/464 |
| 10,599,599 | B2 * | 3/2020 | Kawai | G06F 15/7892 |
| 11,025,752 | B1 * | 6/2021 | Eiriksson | H04L 69/321 |
| 2002/0010849 | A1 * | 1/2002 | Liu | H04M 11/062 712/43 |
| 2014/0351780 | A1 * | 11/2014 | Keckler | G06F 13/409 716/117 |
| 2019/0114548 | A1 * | 4/2019 | Wu | H04W 72/54 |
| 2020/0051309 | A1 * | 2/2020 | Labbe | G06N 3/08 |
| 2020/0213245 | A1 * | 7/2020 | Gray | H04L 12/18 |
| 2022/0058853 | A1 * | 2/2022 | Labbe | G06N 3/045 |
| 2022/0210229 | A1 * | 6/2022 | Maddukuri | G06F 9/3877 |
| 2023/0236993 | A1 * | 7/2023 | Mcfadden | G06F 13/16 710/33 |
| 2023/0289197 | A1 * | 9/2023 | Mcfadden | G06F 9/545 |
| 2023/0360307 | A1 * | 11/2023 | Labbe | G06T 15/40 |
| 2023/0367655 | A1 * | 11/2023 | Prathivadi Bhayankaram | H04L 47/524 |

OTHER PUBLICATIONS

"How to Design SmartNICs Using 1-20 FPGAs to Increase Server Compute Capacity (WP017)", Achronix, Retrieved from internet URL: https://www.achronix.com/sites/default/files/docs/How_to_Design_SmartNICs_Using_FPGAs_to_Increase_Server_Compute_Capacity_WP017.pdf, August 22, 2019, pp. 1-19.

Firestone, et al., "Azure Accelerated Networking: SmartNICs in the Public Cloud", Proceedings of the 15th USENIX Symposium on Networked Systems Design and Implementation, Retrieved from URL: https://www.usenix.org/sites/default/files/nsdi18_full_proceedings_interior.pdf, Apr. 9, 2018, pp. 58-71.

International Search Report and Written Opinion received for PCT Application No. PCT/US2024/052298, Jan. 31, 2025, 14 pages.

International Preliminary Report on Patentability (Chapter I) received for PCT Application No. PCT/US2024/052298 mailed on Jun. 11, 2026, 08 Pages.

* cited by examiner

NETWORK PROCESSING USING FIXED-FUNCTION LOGIC COMPONENTS CLOSE-COUPLED WITH PROGRAMMABLE LOGIC AND SOFTWARE

BACKGROUND

Many different solutions have been proposed to offload host networking processes to hardware. For example, smart network interface cards (SmartNICs) based on field-programmable gate arrays (FPGAs) have been contemplated. Such solutions provide advantages that include programmability that is comparable to software and performance and efficiency that are comparable to hardware. Other solutions include SmartNICs based on application-specific integrated circuits (ASICs), which provide cost-effective performance but is limited in flexibility compared to FPGA-based SmartNICs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations of architectures for network processing using a fixed-function logic per-operation (per-op) component close-coupled with programmable logic and software are provided. One aspect provides an integrated circuit device for network processing, the device comprising a composable processing pipeline that includes a programmable per-op component and a fixed-function logic per-op component that is close-coupled with programmable logic and software. The device further comprises a compute complex component comprising processing circuitry implementing the software for controlling the programmable per-op component and the fixed-function logic per-op component, wherein for a first processing pipeline, the processing circuitry is configured to perform a first function using the programmable per-op component, and for a second processing pipeline, the processing circuitry is configured to perform a second function using the fixed-function logic per-op component.

DETAILED DESCRIPTION

Network processing devices, such as SmartNICs, can be implemented in various ways. Common implementations of such devices include the use of FPGAs and/or ASICs. Different implementations and architectures may be designed to be application-specific, providing various functionalities for different purposes. FPGAs are programmable/re-programmable integrated circuits that provide high flexibility. For example, their programmability/re-programmability allows for more standard manufacturing and interfaces while still enabling their implementations in different applications. On the other hand, ASIC architectures are generally manufactured for specific functions/purposes. As such, they generally operate at higher speeds and are more efficient at performing their intended functions compared to other logic devices. Additionally, as they are manufactured for specific purposes, their space requirements are comparably lower than other logic devices. However, these advantages are weighed against high initial development and testing costs.

Figure 1:
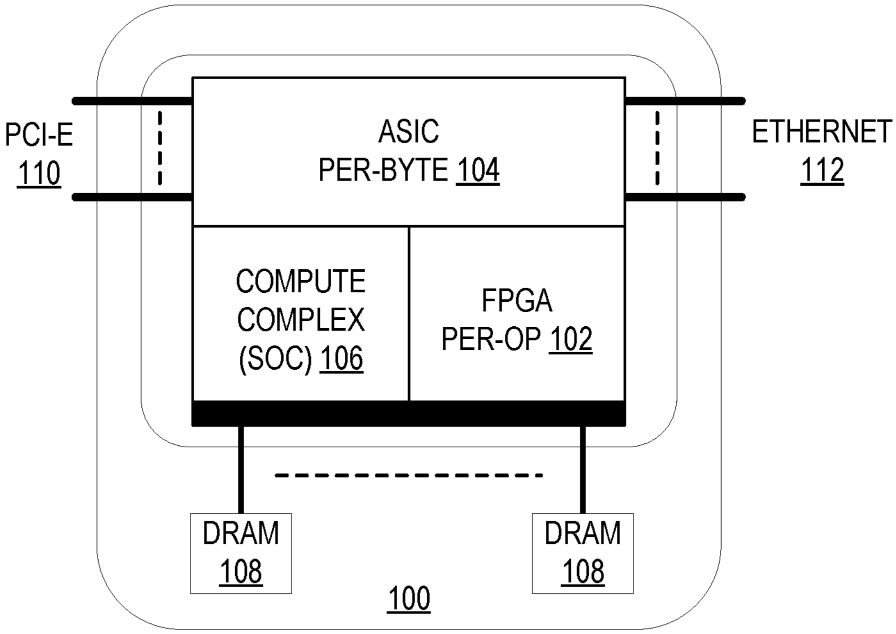
FIG. 1 shows an example integrated circuit device architecture for offloading networking processes.

In some SmartNIC architectures, a combination of both FPGA and ASIC designs is employed. Many such devices are generally implemented with three major components: a per-op component, a per-byte component, and a control component. FIG. 1 shows an example integrated circuit device architecture for offloading networking processes. The example integrated circuit device 100 includes a per-op module 102, a per-byte module 104, and a compute complex module/component 106. The various modules 102-106 are in communication with a set of memory devices. In the illustrative example, the components are in communication with an array of dynamic random-access memory (DRAM) 108. For connectivity, the example integrated circuit device 100 includes a peripheral component interconnect express (PCI-e) connection 110 for connecting to a host device and an Ethernet connection 112 for connecting to other hardware, such as networking switches. As can readily be appreciated, other types and standards of networking protocols can also be implemented.

The modules 102-106 can be implemented with various components and hardware architectures. The per-op module 102 can include one or more per-op components, which are programmable components that can provide various functions. For example, the per-op components can provide functions of processing headers and metadata of network packets and/or storage transactions. The per-op components can be implemented to support programmability at full per-operation rates. In some implementations, a hardened path is used to reduce power in common cases while providing full programmability support for every operation. Power can be determined by every operation being processed in a programmable way. In the example integrated circuit device 100, the per-op components are implemented with FPGA programmable logic. Other types of programmable logic devices can also be implemented. In some implementations, the per-op components are implemented with one or more microcontrollers.

The per-byte module 104 can include one or more per-byte components, which are components that can provide compute intensive functions. The per-byte components are generally implemented in hard logic and are not programmable. In some implementations, the per-byte module 104 includes a component that is configurable. A per-byte component can be considered as a data path processor controlled by a per-op component. The per-byte module 104 provides interfaces, such as PCI-e physical layers (PHYs) and controllers, Ethernet PHYs and controllers, data movement, transformation (e.g., crypto), and computational (e.g., cyclic redundancy check (CRC)) capabilities. For example, the per-byte components can provide functions of processing data bytes for each network packet and/or storage transaction as well as input/output (IO) interfaces. A per-byte component can accept commands with operands from a per-op component. For example, such a command can include "Read host data specified by provided gather-list into buffer, CRC-ing, encrypting, decrypting, checksum-ing, and CRC-ing while doing so." In the example integrated circuit device 100, the per-byte components are implemented with ASICs. The compute complex module 106 can be implemented with a processor-based compute subsystem. For example, the compute complex module 106 can be implemented using various central processing unit (CPU) architectures. In some implementations, the compute complex module 106 includes a plurality of CPU cores configured to run control plane software agents.

Figure 2:
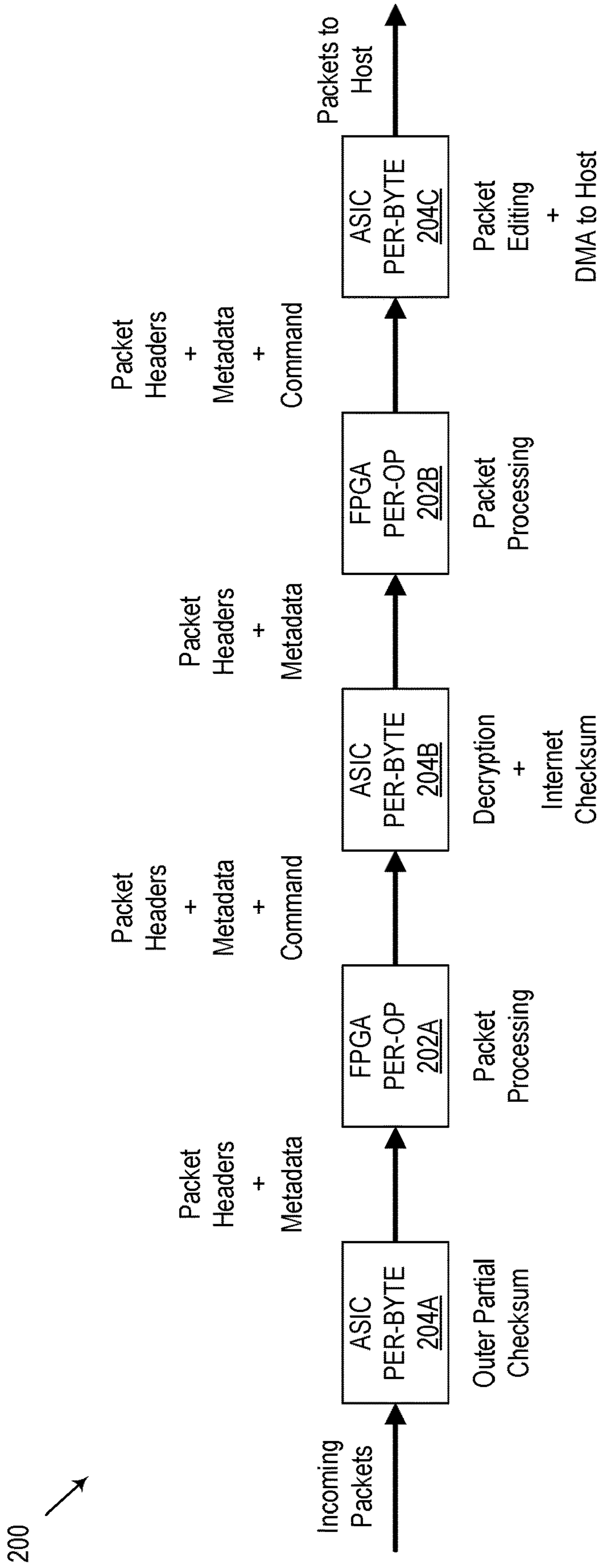
FIG. 2 shows a data flow of an example processing pipeline using FPGA per-op components and ASIC per-byte components, which can be implemented using the integrated circuit device of FIG. 1.

FIG. 2 shows a data flow of an example processing pipeline 200 using FPGA per-op components 202A, 202B and ASIC per-byte components 204A-204C, which can be implemented using the integrated circuit device of FIG. 1. Different device architectures can be implemented to perform the various functions described herein. For example, instead of an FPGA per-op component, any other type of programmable logic device can be implemented as the per-op component. In some implementations, one or more microcontrollers are implemented.

The example processing pipeline 200 depicts the data flow of incoming packets received from a network connection, such as an Ethernet connection for example. The incoming packets arrive at the first ASIC per-byte component 204A, which performs an outer partial checksum operation. Packet headers and metadata are then sent to the first FPGA per-op component 202A for packet processing. The data is then sent to the second ASIC per-byte component 204B, along with command data for invoking the second ASIC per-byte component 204B to perform its intended function. In the example pipeline 200, the second ASIC per-byte component 204B performs decryption and Internet checksum functions. The packet headers and metadata are then sent to the second FPGA per-op component 202B for packet processing. The data is then sent to the third ASIC per-byte component 204C, along with command data for invoking the third ASIC per-byte component 204C to perform its intended function. In the example pipeline 200, the third ASIC per-byte component 204C performs packet editing and direct memory access (DMA) to the host system.

FIG. 2 depicts a specific example of a processing pipeline and is provided for illustrative purposes. Processing pipelines implemented using the integrated circuit device of FIG. 1 can include the performance of other functions, including those not illustrated, using FPGA per-op components and ASIC per-byte components in various configurations. The functions performed can vary depending on the processing pipeline. Although components are depicted as separate entities, they may or may not be implemented as a single physical device as their representation may be logical representations for depicting data flow. In some implementations, the functions performed by the two FPGA per-op components 202A, 202B are performed by the same physical FPGA per-op component device. Similarly, a single ASIC per-byte component can be utilized multiple times at different points within a processing pipeline.

The implementations described in FIGS. 1 and 2 leverage programmable logic to implement per-op components while the per-byte components are implemented in ASIC and are invoked by programmable logic. Such implementations can result in non-optimized data flow and performance for various use cases. For example, implementing all per-op components in FPGA allows for programmability and flexibility, but such implementations pose challenges in FPGA resources availability to support all functions at desired performance levels. For scenarios in which software running in the compute complex module/component 106 needs to process packets/storage transactions, no hardware offload functions are available.

In view of the observations above, network processing device architectures including a composable processing pipeline are provided. The composable processing pipeline includes a configurable programmable per-op component that is close-coupled with programmable logic and software. In some implementations, the programmable per-op component is ASIC-based. The ASIC per-op component can be implemented to perform well-known or highly used functions, which takes advantage of the speed and efficiency of ASIC architecture to improve performance of the network processing device. Such architectures can be implemented for various applications. For example, a SmartNIC architecture can be implemented using a configurable ASIC per-op component close-coupled with programmable logic and software to provide flexibility in supporting various use case scenarios. A set of uniform application programming interfaces (APIs) can be defined for configurable hard-wired logic, software, and programmable logic to invoke per-op and per-byte offload/acceleration functions implemented in ASIC. In contrast, traditional architectures utilize different sets of APIs used separately by hardware/software. In some implementations, a configurable ASIC per-op component is implemented to be invokable by programmable logic and software in a compute complex component via a set of uniform APIs. For example, the ASIC per-op component can be implemented such that each functional and sub-functional block can be invoked directly by hardware, by FPGA, or by software running in the compute complex to perform the set functions.

Architectures implementing configurable ASIC per-op components close-coupled with programmable logic and software can enable access to processing pipelines that provide optimized data flow for many different use cases. For example, use cases and related processing pipelines that involve low programmability can implement such configurable ASIC per-op components to reduce latency and cross section bandwidth between ASIC and FPGA. In some implementations, The ASIC per-op component includes network packet and storage IO processing functional blocks. Each block can be individually invoked by FPGA programmable logic or software in the compute complex component to perform its set function(s). In some processing pipelines, such functions can also be invoked by the arrival event of network packet and storage transactions.

Figure 3:
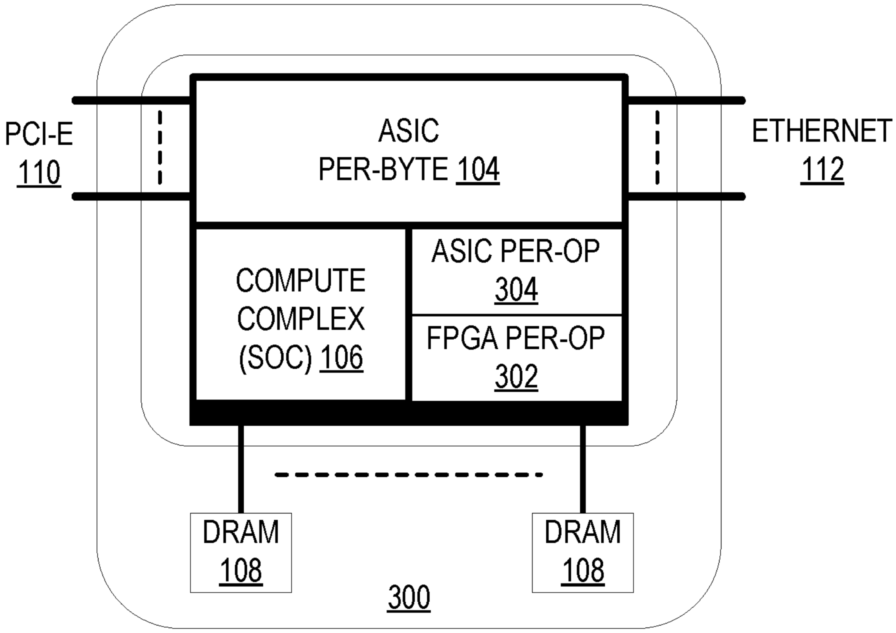
FIG. 3 shows an example integrated circuit device architecture with FPGA per-op components and ASIC per-op components.

FIG. 3 shows an example integrated circuit device architecture with FPGA per-op components and ASIC per-op components. Similar to the example illustrated in FIG. 1, the example integrated circuit device 300 of FIG. 3 includes a compute complex module 106 and a per-byte module 104 implemented with ASIC per-byte components. The example integrated circuit device 300 further includes a per-op module that includes both an FPGA per-op component 302 and an ASIC per-op component 304. As can readily be appreciated, the device 300 can include multiple FPGA per-op components 302 and/or multiple ASIC per-op components 304. Furthermore, the per-op components 302, 304 can be implemented in various ways. The FPGA per-op component 302 can also be implemented using any programmable logic device, including non-FPGA architectures. In some implementations, one or more microcontrollers are implemented. The ASIC per-op component 304 can also be implemented using any fixed-function logic device, including non-ASIC architectures. The ASIC per-op component 304 can be implemented to include different functional and/or sub-functional blocks, including but not limited to a network packet processing functional block and a storage input/output processing functional block. Similar to the example illustrated in FIG. 1, the example integrated circuit device 300 of FIG. 3 includes DRAM 108 and PCI-e 110 and Ethernet 112 interfaces. As can readily be appreciated, other types and standards of networking protocols can also be implemented.

The ASIC per-op component 304 can be implemented as a configurable component that is close-coupled with programmable logic and software in the compute complex component 106. In some implementations, the ASIC per-op component 304 includes functional blocks that can be individually invoked using a set of uniform APIs as defined for the FPGA per-op component 302. Such implementations provide a high degree of flexibility with combinations of software and hardware functional blocks to implement processing pipeline for various use cases and to allow customization in various deployment scenarios. For example, a first processing pipeline can be performed utilizing the FPGA per-op component 302 to perform its set function(s) while bypassing the ASIC per-op component 304. A second processing pipeline can be performed utilizing the ASIC per-op component 304 to perform its set function(s) while bypassing the FPGA per-op component 302.

Figure 4:
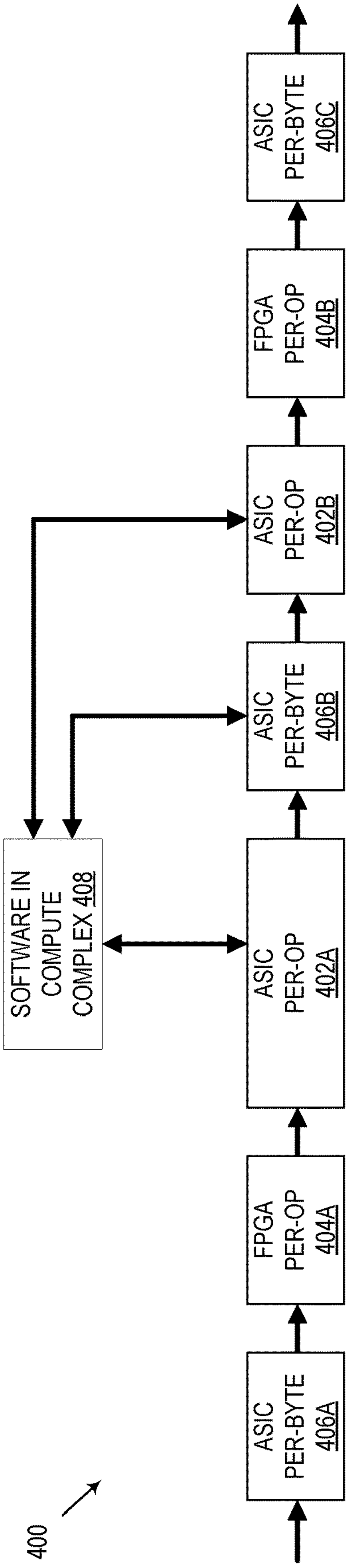
FIG. 4 shows a data flow of an example composable processing pipeline using an ASIC per-op component close-coupled with programmable logic and software, which can be implemented using the integrated circuit device of FIG. 3.

FIG. 4 shows a data flow of an example composable processing pipeline 400 using fixed-function logic per-op components 402A, 402B close-coupled with programmable logic and software. In addition to the configurable fixed-function logic per-op components 402A, 402B, the example composable processing pipeline 400 further includes programmable per-op components 404A, 404B and fixed-function logic per-byte components 406A-406C. For illustrative purposes, fixed-function logic components are illustrated as ASIC-based components but may be implemented using any type of fixed-function logic architecture. Similarly, programmable per-op components are illustrated as FPGA-based components but may be implemented using any type of programmable logic device architecture. Software 408 implemented in a compute complex component can invoke the ASIC per-op components 402A, 402B and the interceding ASIC per-byte component 406B to perform their set functions. The example processing pipeline 400 provides a high-level diagram that shows the logical data flow of incoming packets received from a network connection, such as an Ethernet connection for example.

Compared to the pipeline described in FIG. 2, the example composable processing pipeline 400 of FIG. 4 further includes ASIC per-op components 402A, 402B that are close-coupled with programmable logic and software 408 in the compute complex component and invokable through a set of uniform APIs. The ASIC per-op components 402A, 402B can be implemented in various ways. In some implementations, the ASIC per-op components 402A, 402B are implemented to include network packet and storage IO processing functional blocks, where each block can be individually invoked by programmable logic or the software 408 implemented in the compute complex component. Depending on the processing pipeline to be performed, the ASIC per-op components 402A, 402B can be bypassed or, using a defined API, can be invoked to perform offload/acceleration functions provided in functional blocks implemented in ASIC. For example, a first processing pipeline can be performed utilizing the FPGA per-op components 404A, 404B to perform their set functions while bypassing the ASIC per-op components 402A, 402B. A second processing pipeline can be performed utilizing the ASIC per-op components 402A, 402B to perform their set functions while bypassing the FPGA per-op components 404A, 404B. The semantics to invoke the acceleration functions can include parsing the packet, performing certain types of lookups, performing cryptographic offload on payloads, etc. To further support different use cases and scenarios, the interceding ASIC per-byte component 406B can be invoked by the software 408 implemented in the compute complex component, the preceding ASIC per-op component 402A, or the preceding FPGA per-op component 404A.

The architecture depicted in FIG. 4 provides a configurable and flexible system that can implement a composable processing pipeline, supporting various processing pipelines and use cases. For example, the processing pipeline 400 can be configured to support a composed processing pipeline functionally similar to the processing pipeline depicted in FIG. 2, where the FPGA per-op components 404A, 404B control the acceleration functions to be invoked for each networking packet and/storage IO transactions. In such an implementation, the ASIC per-op components 402A, 402B may be bypassed in the processing pipeline.

Figure 5:
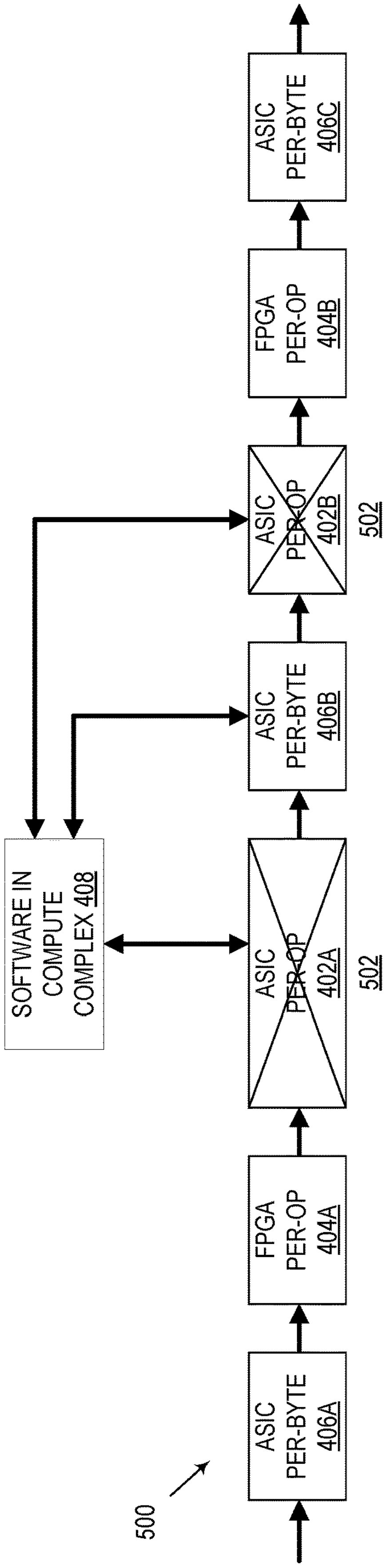
FIG. 5 shows a data flow of an example composable processing pipeline bypassing ASIC per-op components, which can be implemented using the integrated circuit device of FIG. 3.

FIG. 5 shows a data flow of an example composable processing pipeline 500 bypassing ASIC per-op components 402A, 402B. In the example composable processing pipeline 500, the ASIC per-op components 402A, 402B are depicted as being bypassed 502, and the FPGA per-op components 404A, 404B handle the processing. Interceding ASIC per-byte component 406B can be invoked by the software 408 implemented in the compute complex component or the preceding FPGA per-op component 404A (bypassing a first ASIC per-op component 402A). Packet headers and metadata are then forwarded to a second FPGA per-op component 404B from the interceding ASIC per-byte component 406B, bypassing a second ASIC per-op component 402B.

By bypassing the ASIC per-op components 402A, 402B, the composable processing pipeline 500 depicted in FIG. 5 performs functionally similar as the processing pipeline depicted in FIG. 2. With configurable ASIC per-op components, other processing pipelines can be implemented for different scenarios and use cases. For example, a different processing pipeline can be implemented where the ASIC per-op components are invoked to perform the set functions while the FPGA per-op components are bypassed.

Figure 6:
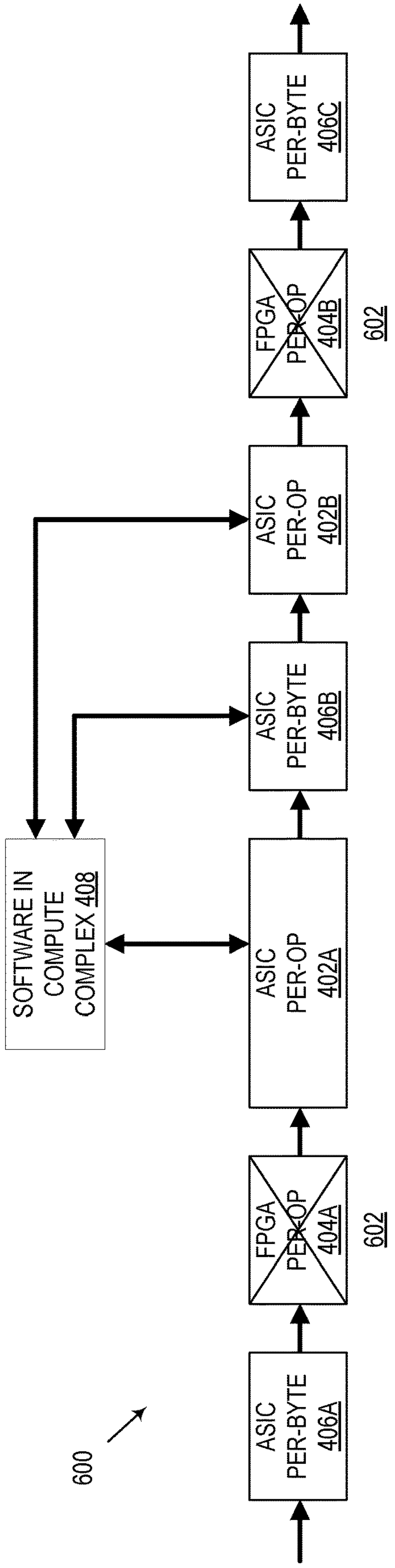
FIG. 6 shows a data flow of an example composable processing pipeline bypassing FPGA per-op components, which can be implemented using the integrated circuit device of FIG. 3.

FIG. 6 shows a data flow of an example composable processing pipeline 600 bypassing FPGA per-op components 404A, 404B. In the example composable processing pipeline 600, the FPGA per-op components 404A, 404B are depicted as being bypassed 602, and per-op functions are executed in the ASIC pipeline through ASIC per-op components 402A, 402B. The ASIC per-op components are close-coupled with programmable logic and can take inputs that would otherwise be fed into the FPGA per-op components. For example, the model depicted includes an ASIC per-byte component 406A that feeds command data into the FPGA per-op component 404A and, when the FPGA per-op component 404A is bypassed, into the ASIC per-op component 402A. In such scenarios, the per-byte functions performed by ASIC per-byte components 406B, 406C can be directly invoked by the ASIC per-op components 402A, 402B using a set of uniform APIs similarly defined for the FPGA per-op components 404A, 404B.

FIGS. 5 and 6 depict two different processing pipelines where the per-op functions are performed by either FPGA per-op components (FIG. 5) or ASIC per-op components (FIG. 6). The non-utilized per-op components are bypassed. The model illustrated in FIG. 4 enables performance of both processing pipelines by implementing configurable ASIC per-op components close-coupled with programming logic and software. In such implementations, the functional processing pipeline still operates despite the bypassed components as the remaining components can operate in such scenarios using uniform APIs. For example, different components can be configured to be invokable by a same set of uniform APIs. In addition to the two processing pipelines illustrated in FIGS. 5 and 6, other use cases involving different combinations of bypassed components can be implemented.

Figure 7:
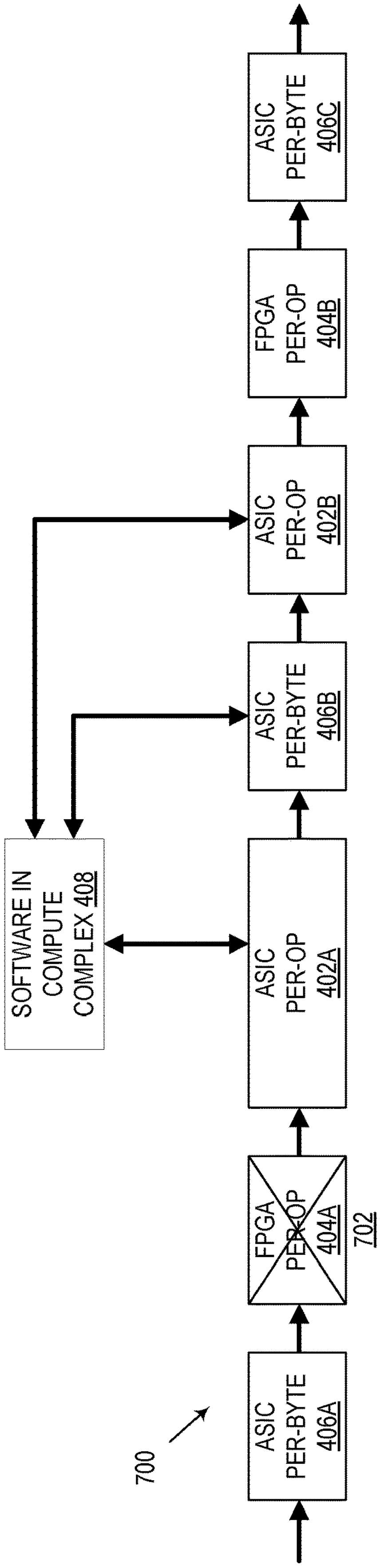
FIG. 7 shows a data flow of an example composable processing pipeline using an ASIC per-op component for front end processing and an FPGA per-op component for back-end processing, which can be implemented using the integrated circuit device of FIG. 3.

FIG. 7 shows a data flow of an example composable processing pipeline 700 using an ASIC per-op component 402A for front end processing and an FPGA per-op component 404B for back-end processing. In the example composable processing pipeline 700, the overall per-op functions are split into a "front-end" and a "back-end." Such implementations can be advantageous for various use cases. For example, performing front-end processing using an ASIC per-op component 402A and back-end processing using an FPGA per-op component 404B can be implemented when the emerging functions cannot be fully supported by the ASIC per-op component 402A but can be complemented by the FPGA per-op component 404B. As shown in FIG. 7, the first FPGA per-op component 404A is bypassed 702, and the front-end processing is performed by an ASIC per-op component 402A. A second FPGA per-op component 406B can be used to provide complementary functions to the ASIC per-op component 402A for the back-end processing. Although FPGA per-op components 406A, 406B are discussed as separate components, they may be implemented as a single physical component as their depiction in the Figures are logical representations for the purposes of representing data flow.

Figure 8:
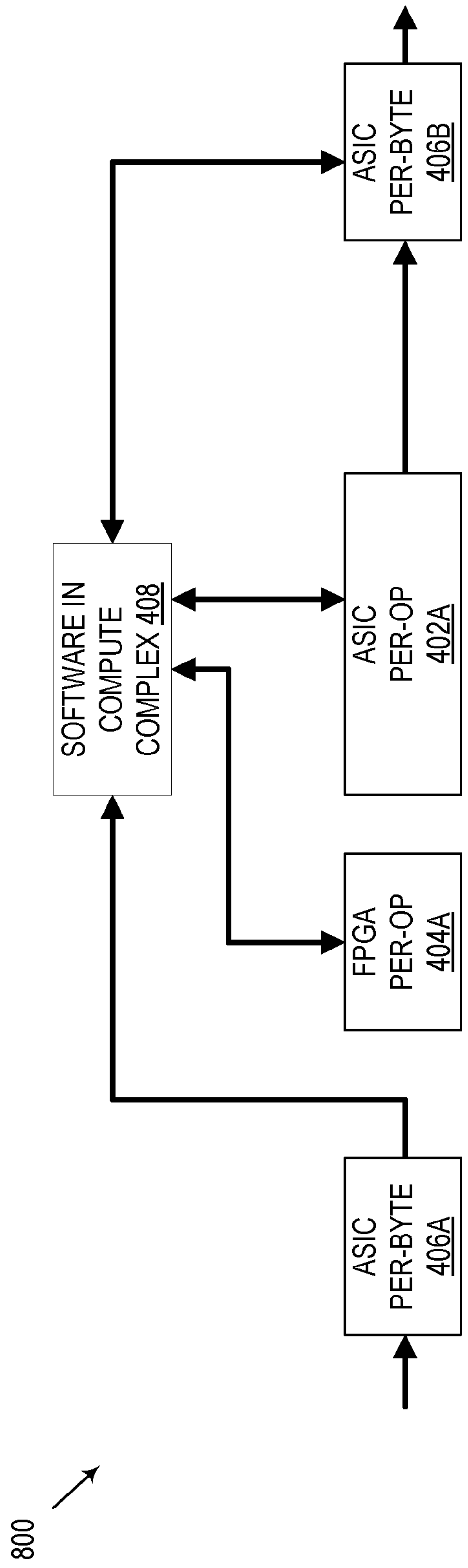
FIG. 8 shows a data flow of an example composable processing pipeline where software initiates per-op and per-byte processing supported by ASIC per-byte, ASIC per-op, and FPGA per-op components, which can be implemented using the integrated circuit device of FIG. 3.

In addition to different processing pipelines and data flows utilizing the bypass and implementations of different ASIC and FPGA per-op components, the architecture described herein enable processing pipelines in which software running in a compute complex component provides the main control. FIG. 8 shows a data flow of an example composable processing pipeline 800 where software 408 initiates per-op and per-byte processing supported by ASIC per-byte, ASIC per-op, and FPGA per-op components. As shown, the software 408 running in the compute complex component provides the main control that orchestrates the processing pipeline 800. As shown by the depicted arrows in FIG. 8, the software 408 running in the compute complex component can invoke ASIC/FPGA per-op as well as ASIC per-byte functions from their respective components to leverage acceleration functions implemented in the hardware functional blocks. Data flow is mainly handled by the software 408, and the functions can be invoked accordingly via a set of uniform APIs as defined for the respective component. For example, APIs for invoking a given component can be uniformly applied by the software 408 running in the compute complex component.

FIGS. 4-8 depict specific examples of processing pipelines utilizing various components and their set functions. Processing pipelines implemented using the integrated circuit device of FIG. 3 can include the implementations of various FPGA and ASIC components with different functional and sub-functional blocks for the performance of different functions, including those not illustrated or discussed herein. As can readily be appreciated, the type of components and functions implemented can vary depending on the processes to be performed. For example, FIGS. 4-8 illustrate fixed-function logic components as ASIC-based components but such components be implemented using any type of fixed-function logic architecture. Similarly, programmable per-op components are illustrated as FPGA-based components but may be implemented using any type of programmable logic device architecture. Additionally, FIGS. 4-8 illustrate logical representations of data flow in various processing pipelines. As such, the components illustrated and described may represent a single physical device or multiple devices. For example, a depicted processing pipeline may include multiple FPGA per-op components. In a physical implementation, the FPGA components may be implemented as a single FPGA device, and the data flow is illustrated to go through said device multiple times (e.g., for packet processing).

Figure 9:
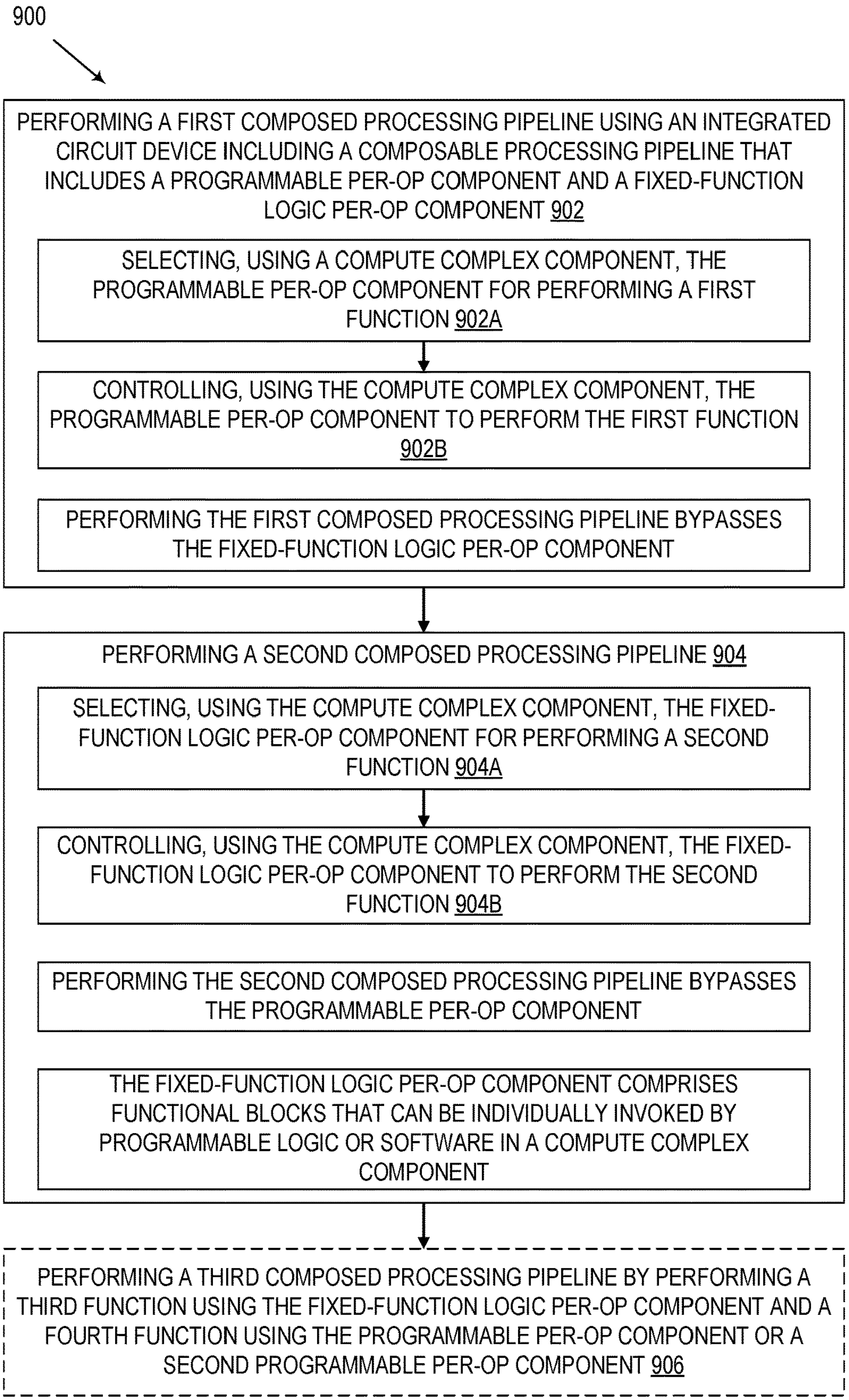
FIG. 9 shows a flow diagram of an example method for network processing, which can be enacted on the integrated circuit device of FIG. 3.

FIG. 9 shows a flow diagram of an example method 900 for network processing. The method 900 can be performed using an integrated circuit device that includes a composable processing pipeline capable of implementing different composed processing pipelines. The composable processing pipeline includes a programmable per-op component and fixed-function logic per-op component. For example, the method 900 can be performed using the integrated circuit device depicted and described in FIG. 3. In some implementations, the programmable per-op component includes an FPGA per-op component. However, other programmable devices such as microcontrollers and other programmable processors may be implemented as a programmable per-op component. The fixed-function logic per-op component can be implemented using any fixed-function logic architecture. In some implementations, the fixed-function logic per-op component includes an ASIC per-op component.

At step 902, the method 900 includes performing a first composed processing pipeline. Performing the first composed processing pipeline includes, at substep 902A, selecting, using a compute complex component, the programmable per-op component for performing a first function of the first composed processing pipeline. At substep 902B, the compute complex component controls the programmable per-op component to perform the first function. In some implementations, performing the first composed processing pipeline includes bypassing the fixed-function logic per-op component. An example of such a pipeline bypassing the fixed-function logic per-op component is depicted in FIG. 5.

At step 904, the method 900 includes performing a second composed processing pipeline. Performing the second composed processing pipeline includes, at substep 904A, selecting, using the compute complex component, the fixed-function logic per-op component for performing a second function of the second composed processing pipeline. At substep 904B, the compute complex component controls the fixed-function logic per-op component to perform the second function. The fixed-function logic per-op component can be configured to be invokable with programmable logic and software in a compute complex component via a set of uniform APIs. In some implementations, the fixed-function logic per-op component includes functional blocks and/or sub-functional blocks, including but not limited to network packet and storage IO processing functional blocks. The functional and sub-functional blocks can be implemented to be individually invoked with programmable logic or software in a compute complex component to perform its set function(s).

In some implementations, performing the second composed processing pipeline includes bypassing the programmable per-op component. An example of such a pipeline bypassing the programmable per-op component is depicted in FIG. 6. In some implementations, performing the second composed processing pipeline includes performing a third function using a fixed-function logic per-byte component of the integrated circuit device, such as an ASIC per-byte component for example. The fixed-function logic per-byte component can be implemented to be invokable by a uniform set of APIs. In some implementations, the fixed-function logic per-byte component is invokable by the programmable per-op component and the fixed-function logic per-op component. In further implementations, the fixed-function logic per-byte component is invokable by software running in a compute complex component.

In addition to the composed processing pipelines described above with respect to steps 902 and 904, other variations and scenarios can be implemented using a similar integrated circuit device design. At step 906, the method 900 optionally includes performing a third composed processing pipeline. The third composed processing pipeline includes performing a third function using the fixed-function logic per-op component and performing a fourth function using a programmable per-op component, which may or may not be the same programmable per-op component described above with respect to the performance of the first function in the first composed processing pipeline. For example, the integrated circuit device can be implemented to perform functions not fully supported by a fixed-function logic per-op component by using a programmable per-op component to perform complementary functions to the fixed-function logic per-op component. In some implementations, the fixed-function logic per-op component performs a "front-end processing" function, and the programmable per-op component performs a "back-end processing" function that is complementary to the front-end processing. An example of such a pipeline performing separate front-end and back-end processing using different components is depicted in FIG. 7.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
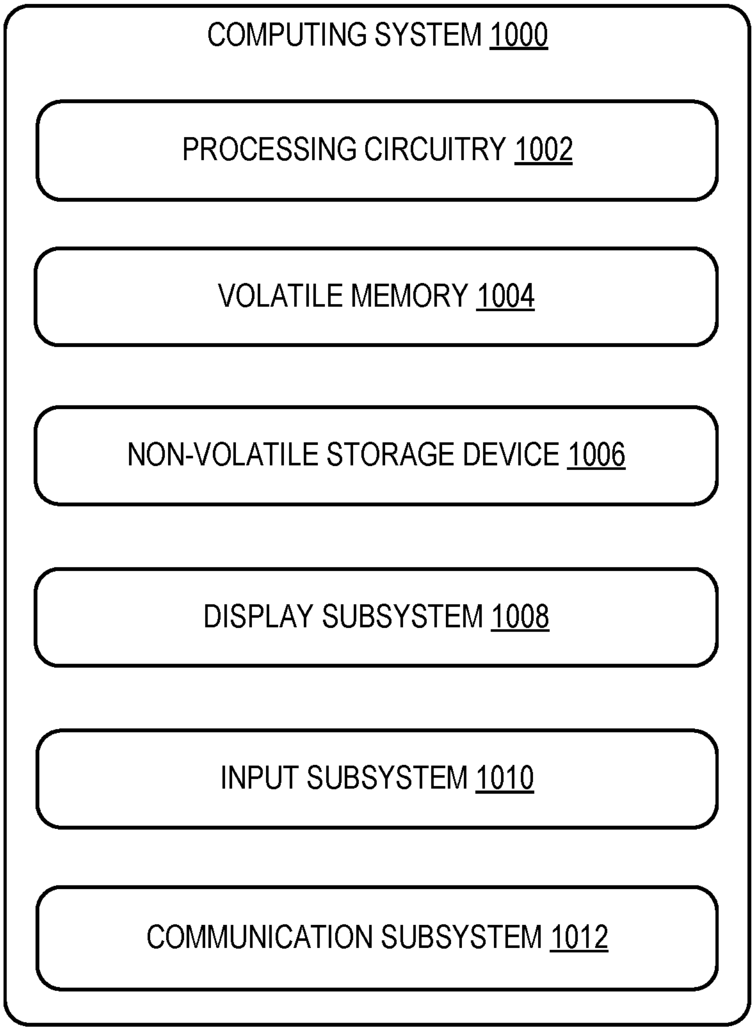
FIG. 10 shows a schematic view of an example computing system, which can implement the integrated circuit device of FIG. 3.

FIG. 10 schematically shows a non-limiting embodiment of a computing system 1000 that can enact one or more of the methods and processes described above. For example, computing system 1000 may implement the integrated circuit device 300 described above and illustrated in FIG. 3. Computing system 1000 is shown in simplified form. Components of computing system 1000 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 1000 includes processing circuitry 1002, volatile memory 1004, and a non-volatile storage device 1006. Computing system 1000 may optionally include a display subsystem 1008, input subsystem 1010, communication subsystem 1012, and/or other components not shown in FIG. 10.

Processing circuitry typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 1002 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 1002.

Non-volatile storage device 1006 includes one or more physical devices configured to hold instructions executable by the processing circuitry to implement the methods and processes described herein. When such methods and processes are implemented, the state of non-volatile storage device 1006 may be transformed—e.g., to hold different data.

Non-volatile storage device 1006 may include physical devices that are removable and/or built in. Non-volatile storage device 1006 may include optical memory, semiconductor memory, and/or magnetic memory, or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by processing circuitry 1002 to temporarily store information during processing of software instructions. It will be appreciated that volatile memory 1004 typically does not continue to store instructions when power is cut to the volatile memory 1004.

Aspects of processing circuitry 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via processing circuitry 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a GUI. As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with processing circuitry 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, camera, or microphone.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 1000 to send and/or receive messages to and/or from other devices via a network such as the Internet.

The following paragraphs provide additional description of the subject matter of the present disclosure. One aspect provides an integrated circuit device for network processing, the device comprising: a composable processing pipeline comprising: a programmable per-op component; and a fixed-function logic per-op component that is close coupled with programmable logic and software; and a compute complex component comprising processing circuitry implementing the software for controlling the programmable per-op component and the fixed-function logic per-op component, wherein: for a first composed processing pipeline, the processing circuitry is configured to perform a first function using the programmable per-op component; and for a second composed processing pipeline, the processing circuitry is configured to perform a second function using the fixed-function logic per-op component. In this aspect, additionally or alternatively, wherein: for the first composed processing pipeline, the processing circuitry is configured to bypass the fixed-function logic per-op component; and for the second composed processing pipeline, the processing circuitry is configured to bypass the programmable per-op component. In this aspect, additionally or alternatively, wherein the fixed-function logic per-op component comprises functional blocks that can be individually invoked using a uniform set of application programming interfaces (APIs). In this aspect, additionally or alternatively, wherein the functional blocks can be individually invoked by the compute complex component. In this aspect, additionally or alternatively, wherein the functional blocks comprise one or more of a network packet processing functional block or a storage input/output processing functional block. In this aspect, additionally or alternatively, wherein the programmable per-op component comprises a field-programmable gate array (FPGA) per-op component. In this aspect, additionally or alternatively, wherein the fixed-function logic per-op component comprises an application-specific integrated circuit (ASIC). In this aspect, additionally or alternatively, the integrated circuit device further comprises an application-specific integrated circuit (ASIC) per-byte component, wherein, for the second composed processing pipeline, the processing circuitry is configured to perform a third function using the ASIC per-byte component. In this aspect, additionally or alternatively, wherein the ASIC per-byte component can be invoked by the fixed-function logic per-op component or the programmable per-op component using a uniform set of application programming interfaces (APIs). In this aspect, additionally or alternatively, the integrated circuit device further comprises a second programmable per-op component, wherein, for a third composed processing pipeline, the processing circuitry is configured to perform a third function using the fixed-function logic per-op component and a fourth function using the second programmable per-op component.

Another aspect provides a method for network processing enacted on an integrated circuit device comprising a composable processing pipeline, the method comprising: performing a first composed processing pipeline, comprising: selecting, using a compute complex component, a programmable per-op component for performing a first function of the first composed processing pipeline; and controlling, using the compute complex component, the programmable per-op component to perform the first function; and performing a second composed processing pipeline, comprising: selecting, using the compute complex component, a fixed-function logic per-op component for performing a second function of the second composed processing pipeline, wherein the fixed-function logic per-op component is close-coupled with programmable logic and software running on the compute complex component; and controlling, using the compute complex component, the fixed-function logic per-op component to perform the second function. In this aspect, additionally or alternatively, wherein: performing the first composed processing pipeline comprises bypassing the fixed-function logic per-op component; and performing the second composed processing pipeline comprises bypassing the programmable per-op component. In this aspect, additionally or alternatively, wherein the fixed-function logic per-op component comprises functional blocks that can be individually invoked by a compute complex component of the integrated circuit device using a uniform set of application programming interfaces (APIs). In this aspect, additionally or alternatively, wherein the programmable per-op component comprises a field-programmable gate array (FPGA) per-op component; and wherein the fixed-function logic per-op component comprises an application-specific integrated circuit (ASIC) per-op component. In this aspect, additionally or alternatively, wherein performing the second composed processing pipeline comprises performing a third function using an application-specific integrated circuit (ASIC) per-byte component, wherein the ASIC per-byte component is invokable by the fixed-function logic per-op component, the programmable per-op component, or the compute complex component using a uniform set of application programming interfaces (APIs).

Another aspect provides an integrated circuit device for network processing, the device comprising: a composable processing pipeline comprising: a field-programmable gate array (FPGA) per-op component; and an application-specific integrated circuit (ASIC) per-op component; and a compute complex component comprising processing circuitry implementing software for controlling the FPGA per-op component and the ASIC per-op component, wherein: for a first composed processing pipeline, the processing circuitry is configured to bypass the ASIC per-op component; and for a second composed processing pipeline, the processing circuitry is configured to bypass the FPGA per-op component. In this aspect, additionally or alternatively, wherein the ASIC per-op component comprises functional blocks that can be individually invoked using a uniform set of application programming interfaces (APIs). In this aspect, additionally or alternatively, wherein the functional blocks can be individually invoked by the compute complex component. In this aspect, additionally or alternatively, the integrated circuit device further comprises an ASIC per-byte component, wherein, for the second composed processing pipeline, the processing circuitry is configured to perform a function using the ASIC per-byte component. In this aspect, additionally or alternatively, wherein the ASIC per-byte component can be invoked by the ASIC per-op component, the FPGA per-op component, or the compute complex component using a uniform set of application programming interfaces (APIs).

"And/or" as used herein means any or all of multiple stated possibilities. For example, the phrase "element A and/or element B" covers embodiments having element A alone, element B alone, or elements A and B taken together.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A network interface card comprising an integrated circuit device for network processing, the network interface card comprising:

a composable processing pipeline comprising:

a programmable per-op component; and a fixed-function logic per-op component configurable with programmable logic and software, wherein the programmable per-op component and the fixed-function logic per-op component provide functions for processing headers and metadata for network packets; and a compute complex component comprising processing circuitry implementing the software for controlling the programmable per-op component and the fixed-function logic per-op component, wherein:

for a first composed processing pipeline, the processing circuitry is configured to perform a first function using the programmable per-op component while bypassing the fixed-function logic per-op component; and for a second composed processing pipeline, the processing circuitry is configured to perform a second function using the fixed-function logic per-op component while bypassing the programmable per-op component.

2. The integrated circuit device of claim 1, wherein the fixed-function logic per-op component comprises functional blocks that can be individually invoked using a uniform set of application programming interfaces (APIs).

3. The integrated circuit device of claim 2, wherein the functional blocks can be individually invoked by the compute complex component.

4. The integrated circuit device of claim 2, wherein the functional blocks comprise one or more of a network packet processing functional block or a storage input/output processing functional block.

5. The integrated circuit device of claim 1, wherein the programmable per-op component comprises a field-programmable gate array (FPGA) per-op component.

6. The integrated circuit device of claim 1, wherein the fixed-function logic per-op component comprises an application-specific integrated circuit (ASIC).

7. The integrated circuit device of claim 1, further comprising an application-specific integrated circuit (ASIC) per-byte component for providing functions for processing data bytes of the network packets, wherein, for the second composed processing pipeline, the processing circuitry is configured to perform a third function using the ASIC per-byte component.

8. The integrated circuit device of claim 7, wherein the ASIC per-byte component can be invoked by the fixed-function logic per-op component or the programmable per-op component using a uniform set of application programming interfaces (APIs).

9. The integrated circuit device of claim 1, further comprising a second programmable per-op component, wherein, for a third composed processing pipeline, the processing circuitry is configured to perform a third function using the fixed-function logic per-op component and a fourth function using the second programmable per-op component.

10. Enacted on a network interface card comprising a composable processing pipeline, a method for network processing, the method comprising:

performing a first composed processing pipeline, comprising:

selecting, using a compute complex component, a programmable per-op component for performing a first function of the first composed processing pipeline; and controlling, using the compute complex component, the programmable per-op component to perform the first function; and performing a second composed processing pipeline, comprising:

selecting, using the compute complex component, a fixed-function logic per-op component for performing a second function of the second composed processing pipeline, wherein the fixed-function logic per-op component is configurable with programmable logic and software running on the compute complex component; and controlling, using the compute complex component, the fixed-function logic per-op component to perform the second function, wherein the programmable per-op component and the fixed-function logic per-op component provide functions for processing headers and metadata for network packets, wherein the first composed processing pipeline is performed by bypassing the fixed-function logic per-op component, and wherein the second composed processing pipeline is performed by bypassing the programmable per-op component.

11. The method of claim 10, wherein the fixed-function logic per-op component comprises functional blocks that can be individually invoked by a compute complex component of the network interface card using a uniform set of application programming interfaces (APIs).

12. The method of claim 10, wherein the programmable per-op component comprises a field-programmable gate array (FPGA) per-op component; and wherein the fixed-function logic per-op component comprises an application-specific integrated circuit (ASIC) per-op component.

13. The method of claim 10, wherein performing the second composed processing pipeline comprises performing a third function using an application-specific integrated circuit (ASIC) per-byte component for providing functions for processing data bytes of the network packets, wherein the ASIC per-byte component is invokable by the fixed-function logic per-op component, the programmable per-op component, or the compute complex component using a uniform set of application programming interfaces (APIs).

14. A network interface card comprising an integrated circuit device for network processing, the network interface card comprising:

a composable processing pipeline comprising:

a field-programmable gate array (FPGA) per-op component; and an application-specific integrated circuit (ASIC) per-op component, wherein the FPGA per-op component and the ASIC per-op component provide functions for processing headers and metadata for network packets; and a compute complex component comprising processing circuitry implementing software for controlling the FPGA per-op component and the ASIC per-op component, wherein:

for a first composed processing pipeline, the processing circuitry is configured to perform a first function using the FPGA per-op component while bypassing the ASIC per-op component; and for a second composed processing pipeline, the processing circuitry is configured to perform a first function using the ASIC per-op component while bypassing the FPGA per-op component.

15. The integrated circuit device of claim 14, wherein the ASIC per-op component comprises functional blocks that can be individually invoked using a uniform set of application programming interfaces (APIs).

16. The integrated circuit device of claim 15, wherein the functional blocks can be individually invoked by the compute complex component.

17. The integrated circuit device of claim 14, further comprising an ASIC per-byte component for providing functions for processing data bytes of the network packets, wherein, for the second composed processing pipeline, the processing circuitry is configured to perform a function using the ASIC per-byte component.

18. The integrated circuit device of claim 17, wherein the ASIC per-byte component can be invoked by the ASIC per-op component, the FPGA per-op component, or the compute complex component using a uniform set of application programming interfaces (APIs).

* * * * *